UNITED STATES PATENT OFFICE.

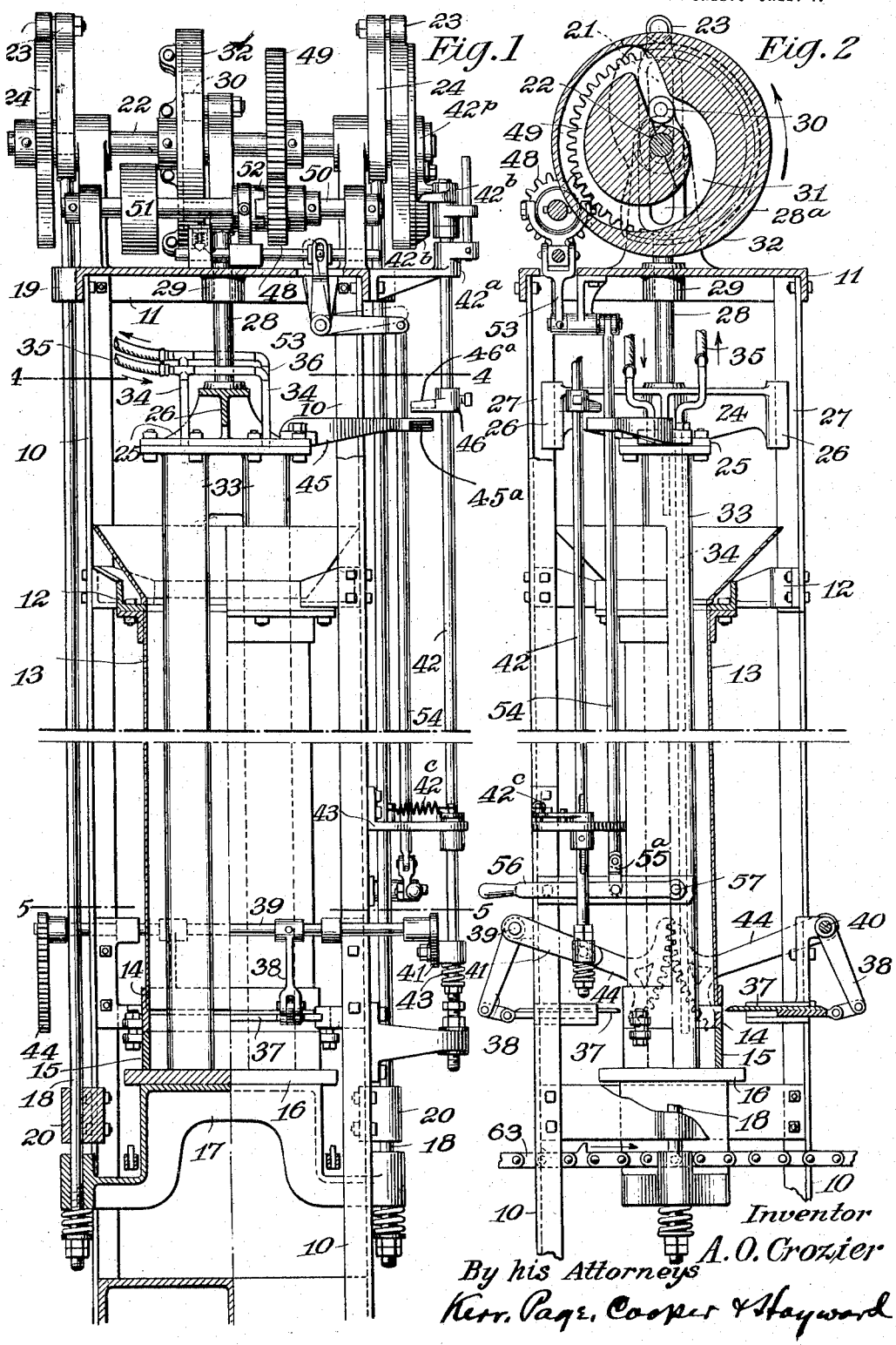

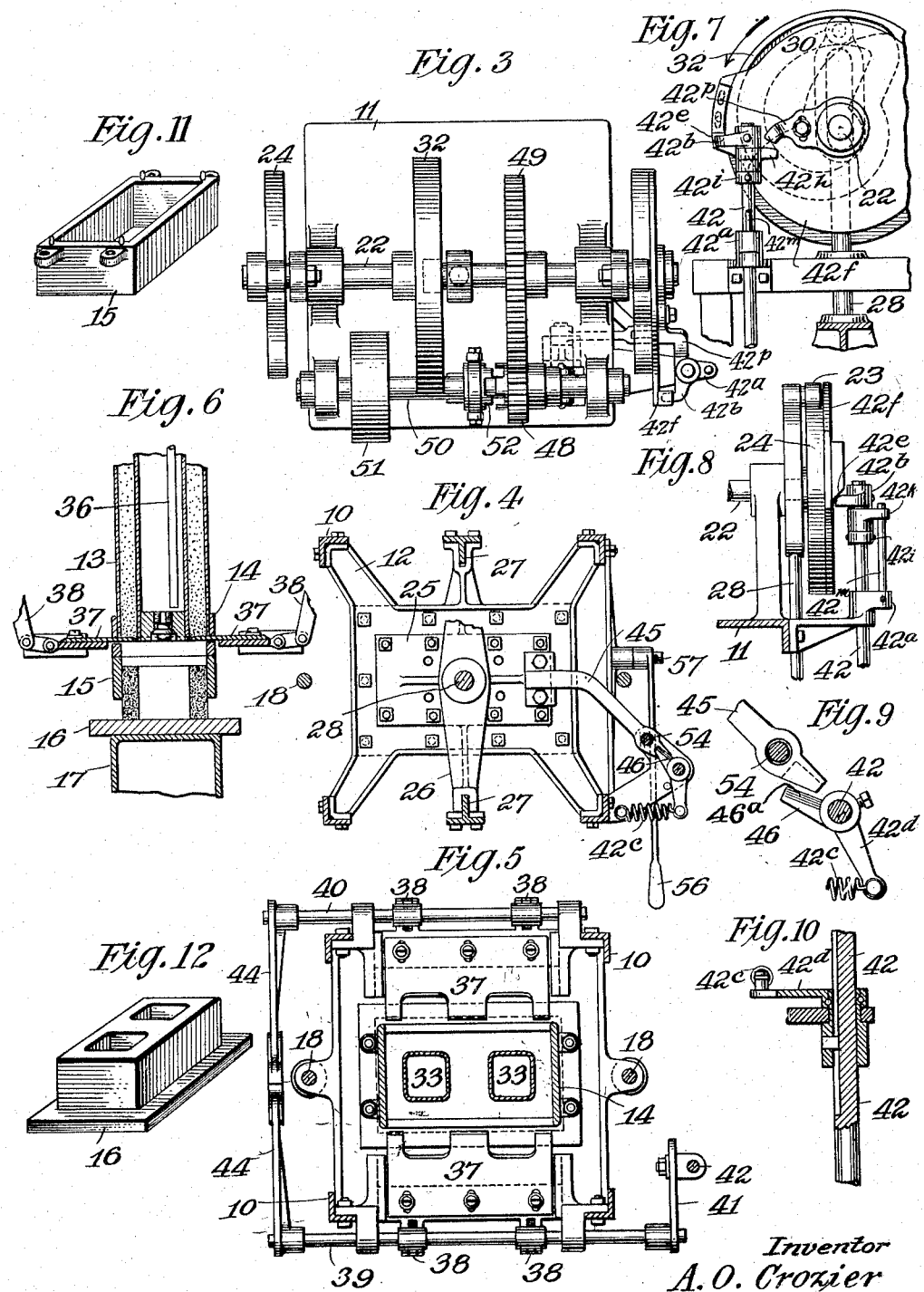

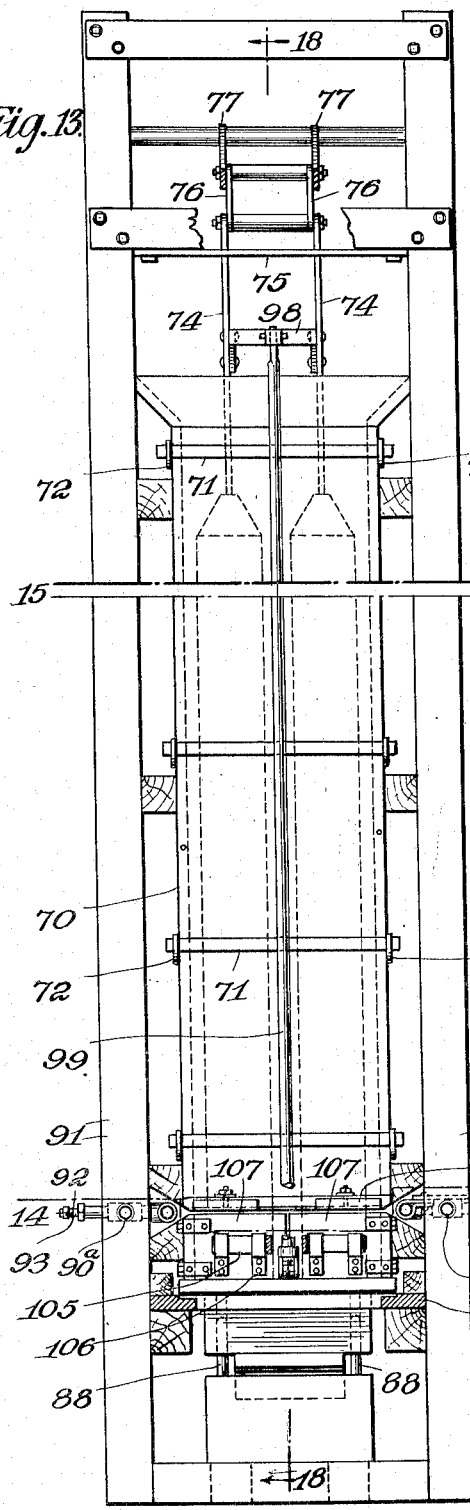
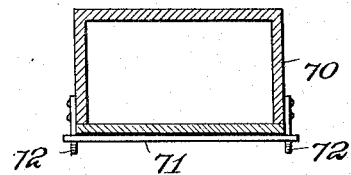
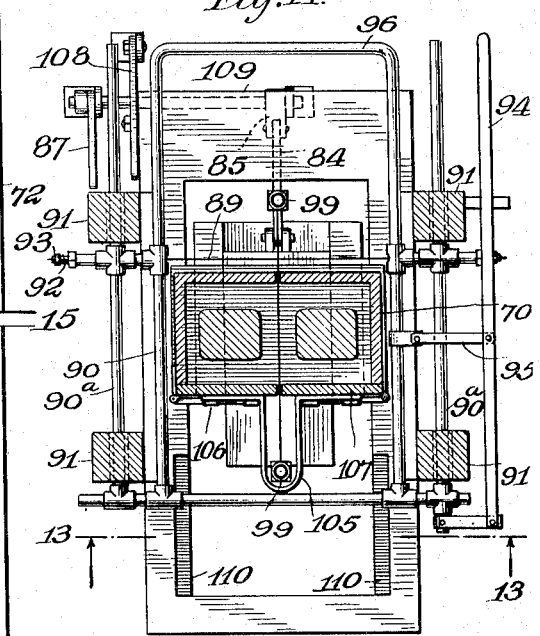
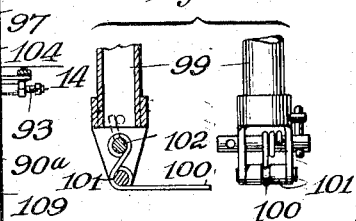

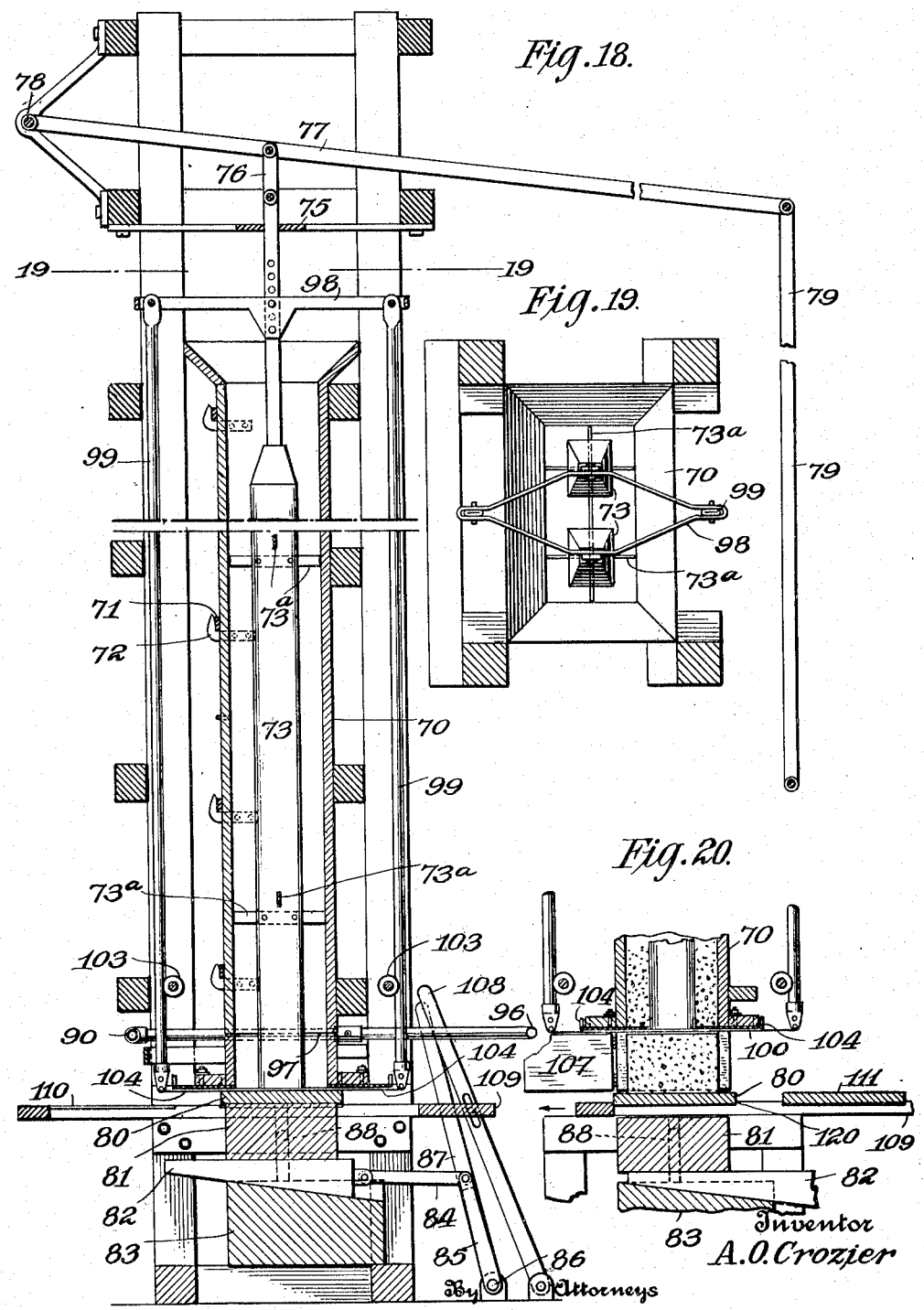

ALFRED OWEN CROZIER, OF NEW YORK, N. Y.

MACHINE FOR MAKING HOLLOW CONCRETE ARTICLES.

1,358,419.	Specification of Letters Patent.	Patented Nov. 9, 1920.

Application filed November 22, 1918. Serial No. 263,648.

*To all whom it may concern:*

Be it known that I, ALFRED OWEN CROZIER, a citizen of the United States, temporarily residing at New York, county and State of New York, have invented certain new and useful Improvements in Machines for Making Hollow Concrete Articles, of which the following is a full, clear, and exact description.

This invention relates to the manufacture of hollow concrete articles, such as bricks, building tile, building blocks, drain pipe, sewer pipe, and the like, and its chief object is to provide an improved machine for the purpose, of an automatic character, by which articles of the kind indicated can be made from a "wet" concrete and yet have a stiffness or consistency enabling them to be self-sustaining without preliminary drying or "setting" in molds or the like. Another object is to provide a machine which is continuous in operation, turning out its products steadily and uniformly without stopping to be supplied with concrete, or cement, or other ingredient of the cementitious mixture used. A further object is to provide a machine which has a "troweling" effect upon the inner and outer surfaces of the articles, thereby smoothing or "slicking" the same, drawing cement to the surface and making the latter harder and less porous. To these and other ends the invention consists in the novel features of construction and combination of elements hereinafter described.

In carrying out the invention in the preferred manner I provide an element in the form of an upright hollow shaft or container, the inner cross-sectional contour of which (at least at the lower portion) is that desired for the outer cross-sectional contour of the articles which are to be made. Inside the hollow shaft I provide an element in the form of one or more vertical cores, of an outer cross-sectional contour (at least at the lower part) adapted to give the desired configuration to the inside of the hollow concrete articles. I also provide means for raising and lowering one or both of the aforesaid elements, preferably the core or cores. Preferably, also, the core or cores are hollow, for the purpose hereafter described. Under the shaft, and closing the bottom thereof, is a removable "pallet."

The shaft, with the core or cores in place, is filled to the desired height with a cementitious mixture, say cement, sand and water, of a "slushy" consistency, by which is meant a mixture having rather more water than enough for complete hydration of the cementitious ingredient. The weight of the wet and unset cementitious column thus established has a compacting, or "densifying," and unwatering effect upon its lower portion, this effect being more or less proportional to the height of the column. Preferably the height is such as to compact and unwater the lower portion to a density or stiffness enabling the articles which are severed and removed therefrom to stand alone, that is, be self-sustaining without lateral support.

The unset cementitious column having been established, with the core or cores in place, a pair, one or more knives, preferably one at each side, are passed into the shaft through transverse slots in its lower portion, the cutting edges of one or both knives being shaped to fit around the cores, thereby severing the lower (and more or less compacted or densified) portion of the column. At this stage the severed portion or article is imprisoned in the lower part of the shaft, between the removable pallet or closure below the knives above.

The core or cores (preferably two) are now raised, preferably far enough to bring their bottoms about on a level with or, preferably, slightly above the under surface of the inserted severing knives. The pallet is then lowered, and as it descends the severed concrete article descends with it, after which the pallet is removed, with its load. As the severed product separates from the knife or knives the surface of the product is drawn up in numerous small projections, giving a rough or "stippled" surface. A fresh pallet is now put in place, after which the cores are lowered upon the new pallet and at the same time the severing knives withdrawn, preferably suddenly, allowing the column to drop with the cores more or less violently upon the pallet. The impact thus produced effectively aids in unwatering and densifying or "stabilizing" the lower portion of the column, from which portion the next article is to be severed, and tends to spread the concrete and force it snugly against the surfaces of the shaft and cores, causing it to take perfectly the shape which these members are intended to impart. The operations described are now repeated, thus producing another hollow article, which is removed and laid aside as before, to set and harden or receive such further treatment, for example roughening one or more faces to give "texture," or the application of a facing to one or more surfaces, as may be desired. In the meantime fresh concrete of the proper consistency may be added to the top of the column to compensate for that removed at the bottom.

From the above outline of the preferred mode of operation it will be readily understood that the invention can be embodied in a considerable variety of forms. The embodiments which at the present time are believed to exhibit the invention in its most convenient and effective form, and which have therefore been selected for specific description herein, are designed particularly for making hollow tile and blocks for building purposes. These embodiments are illustrated in the accompanying drawings, in which:

Figure 1 is a front elevation of one embodiment, with the left half partially in vertical section.

Fig. 2 is a side view from the right of Fig. 1, also partly in section.

Fig. 3 is a plan view of Fig. 1.

Figs. 4 and 5 are horizontal sections on lines 4—4 and 5—5, respectively, of Fig. 1.

Fig. 6 is a detail view of the lower part of the hollow shaft, in vertical section, showing the severing knives at their inner positions, with the cores raised and the pallet and severed article descending.

Fig. 7 is a detail view of a part of the mechanism by which the operation of the machine is controlled.

Fig. 8 is a detail view from the left of Fig. 7.

Fig. 9 is a detail sectional plan view on line 4—4 of Fig. 1, at the right.

Fig. 10 is a detail view in vertical section of a part of the knife-actuating mechanism.

Fig. 11 is a detail perspective view of the removable lower part of the shaft.

Fig. 12 is a detail perspective view of one of the hollow blocks produced by the machine, the block being shown on its supporting pallet.

Fig. 13 is a rear elevation of another embodiment of the invention, the sliding pallet-carrier at the bottom being in cross section on line 13—13 of Fig. 14.

Fig. 14 is a sectional plan view on line 14—14 of Fig. 13.

Fig. 15 is a horizontal section of the upright hollow shaft or container, on line 15—15 of Fig. 13.

Fig. 16 is a detail sectional view illustrating the method of holding or fastening in its frame the wire or wires by which the products are severed from the cementitious column.

Fig. 17 illustrates the method of fastening and tautening the wire by which the severed product is cut up into blocks.

Fig. 18 is a central vertical section, about on line 18—18 of Fig. 13.

Fig. 19 is a sectional plan view on line 19—19 of Fig. 18.

Fig. 20 is a detail vertical section of the lower part of the machine, on the same plane as Fig. 18 but showing the operative parts in different positions.

The operative parts of the machine are conveniently mounted in or upon a frame composed of four upright angle irons 10, carrying at the top a cap 11 in the form of a flanged casting having suitable standards for shaft-bearings. Inside the frame and rigidly fastened thereto at a suitable distance below the cap 11, is a centrally apertured spider or plate 12 (see Figs. 1 and 4) which supports the depending hollow shaft or container 13 for the unset cementitious column. This portion of the shaft is conveniently made of smooth sheet metal, of heavy enough gage to withstand without distortion the internal pressure of the concrete with which it is filled. At the bottom of such portion is a collar 14, securely fastened to the uprights 10, and suspended below the collar is a removable section 15 constituting the extreme lower part of the shaft. Below this is a removable closure or pallet 16, supported on a table 17 which is itself carried by the lower ends of the rods 18 movable vertically in upper and lower guides 19, 20. The rods are slotted at the top (as shown at 21, Fig. 2) to pass the horizontal shaft 22, and are equipped with antifriction rollers 23 coöperating with cams 24, on said shaft 22, by which the table and pallet are lowered and raised at the proper times, as will be explained hereinafter.

Above the hollow shaft or container 13 is a vertically movable crosshead 25 having guide-arms 26 engaging the vertical guides 27, Figs. 2 and 4. This crosshead is suspended from a rod 28, which is movable vertically in a guide 29 at the center of cap 11 and is slotted above said cap (as shown at 28ᵃ, Fig. 2) to pass the shaft 22. At its top the rod has a roller 30 engaging a cam groove 31, Fig. 2, in a cam 32 fixed on said shaft 22, the cam groove having the configuration necessary to raise and lower the crosshead at the proper intervals, as explained below. The cores 33, in the present instances two in number, are suspended from the crosshead 25, and are preferably hollow for the sake of lightness and also for permitting the introduction of steam or hot water at suitable temperature to heat the concrete column and thereby start or hasten the hydration of the cementitious ingredient, thus causing a more rapid setting and hardening of the products. For this purpose each core is provided with an inlet pipe 34 connected to a source of steam or hot water (not shown) by means of a flexible hose 35 to permit vertical movement of the cores in the proper manner. The outlet pipes 36 preferably extend well toward the bottoms of the cores, as shown in Fig. 6 for example, so that water accumulating in the cores can be blown out.

The severing knives 37, Figs. 2, 5 and 6, which move into and out of the lower portion of the column through horizontal slots in the collar 14, are actuated by arms 38, Fig. 2, fixed on the horizontal rockshaft 39, 40. The shaft 39 has also an arm 41 (see also Figs. 1 and 5) yieldingly connected to the lower end of a vertically movable rod 42 by means of a spring 43 to rock the shaft and thereby actuate the arms 38 that are connected thereto. The other knife is actuated from the first through the medium of the intermeshing gear-arms 44, fixed on the rockshafts, the two knives being thus advanced and retracted in unison. The actuating rod 42 is itself actuated by means of an arm 45 (Figs. 1 and 4) extending from the crosshead 24 and terminating under a lug or finger 46 adjustable vertically on said actuating rod 42. It will therefore be seen that as the crosshead is elevated, to raise the cores, the arm 45 engages the finger 46 and raises the rod 42, thereby causing the knives to enter the shaft, the parts being so proportioned that knives reach their inner positions and the cores their upper positions at the same or about the same instant. As is shown in Fig. 5, the inner or cutting edges of the knives are recessed to embrace the cores; the recesses being preferably of such depth as to allow the cutting edge, if not actually to meet, at least to come close enough together to effect a clean severing of the lower part of the column.

The shaft 22 is driven by means of gears 48, 49, from a driving shaft 50 (Figs. 1 and 3) which is itself driven by a pulley 51. Shaft 50 rotates the gear 48 through the medium of a clutch 52, the sliding member of which can be shifted into and out of engagement with the other by means of a bell-crank lever 53 connected to a rod 54. The latter has its swinging lower end $55^a$ pivotally connected with the manual controlling lever 56 which is fulcrumed at 57. By means of the lever 56 the clutch can be engaged and disengaged at will to start and stop the machine, as will be readily understood.

At its top the vertically movable rod 42 (which, it will be remembered, actuates the severing knives 37 passes through a fixed guide $42^a$ and above the guide is a finger $42^b$ fixed on the rod. The latter is also capable of limited rotary movement, but by means of a spring $42^c$ and arm $42^d$ (Figs. 1 and 9) it is normally held in a position in which finger 46 is in the path of arm 45 (Fig. 4) and in which finger $42^b$ (Figs. 8 and 9) is held in the path of an incline $42^e$ on an extension of a cam-plate $42^f$ fixed on the rotating cam 24, Fig. 8. It will therefore be seen that as the cam-plate revolves (in the direction of the arrow Fig. 7) the incline will swing the finger $42^b$ outwardly, thereby rocking the vertical rod 42, thus swinging finger 46 off of arm 45. Rod 42 being no longer held up, the gear-arms 44 are free to fall (by gravity) and withdraw the knives 37 from the column. To start the knives in case they should stick, the rod 42 is also provided with an arm $42^h$, mounted between finger $42^b$ and a collar $42^i$ but loose on the rod so that the latter can be rocked as described. Arm $42^h$, however, is held against rotation by means of a finger $42^k$ through which passes a vertical guide-rod $42^m$ fixed on the guide $42^a$. Arm $42^h$ is thus held in the path of the arm $42^p$, Fig. 7, so that if rod 42 should not descend after being rocked by the cam-plate $42^f$, arm $42^p$ will engage arm $42^h$ and depress it, thereby starting the knives 37.

After the rod 42 has dropped, thereby carrying the finger $42^b$ out of engagement with the incline $42^e$ on cam-plate $42^f$, the spring $42^c$, Fig. 1, immediately rocks the rod back to its normal position. Then, however, finger 46 is below the arm 45. When this arm descends, its inclined face $45^a$, Fig. 1, meets the inclined face $46^a$ on finger 46 (Fig. 9) and swings the latter out of the way until the arm is past it, whereupon spring $42^c$ rocks the rod back to normal position, with finger 46 above and in the path of arm 45.

In Figs. 1 and 2 the cores are shown in their lower position and the cams 24 and 32 are revolving in the direction of the arrow at the top of Fig. 2. As cam 32 rotates it begins to raise the cores and arm 45 engages the finger 46 and raises rod 42, thereby rocking shafts 39 and 40 and pushing the knives 37 into the lower portion of the concrete column. As the knives come together, the cams 24 begin to lower the table 17 and pallet 16. The severed tile or block slips down out of the shaft, Fig. 6, and the pallet finally comes down upon the conveyer 63 (actuated by any convenient means not shown) and is carried away. The arms 24 then raise the table and bring the fresh pallet, which in the meantime has been placed on the table, up against the bottom of the shaft.

At this instant the knives are at their innermost position and the cores are at their highest position, with the roller 30 on the dwell of the cam-groove 31 in cam 32. Continuing its rotation in the direction of the arrow, Fig. 7, cam-plate 42$^f$ brings its inclined edge 42$^e$ into engagement with finger 42, thereby rocking the rod 42 which swings the finger 46, Fig. 1, out of engagement with the arm 45. The knives 37 are now released. Just as finger 46 clears arm 45, the drop in cam 32 comes under the roller 30, Fig. 7, and the cores are then freed as the knives are drawn out. Should the knives stick, however, the arm 42$^p$, Fig. 7, an instant later engages the finger 42$^h$ and gives the knives a positive start, as already described.

The knives being withdrawn and the cores freed, the cores and the upper part of the column descend together through the shaft 13 and come to rest on the fresh pallet 16. The cycle is then repeated, the operation continuing as long as the clutch 52 is engaged. From time to time, fresh concrete of proper consistency is added to the top of the column to compensate for the removals at the bottom.

The most important feature of the machine described is the lowering of the cores simultaneously with the descent of the column. Indeed, the friction between the column and the surfaces of the shaft and cores, and the adhesion of the wet concrete to these surfaces, are so great that if the cores were stationary the thin-walled, and therefore relatively light, column would seldom, if ever, descend by gravity. Moreover, the relative movement between the column and the shaft and cores has a marked troweling and compacting effect, which eliminates open spaces due to air bubbles and excess water, smooths the surfaces of the column and draws water and cement to the surfaces, thereby making these surfaces harder and less porous and increasing the density of the column. The water also acts as a lubricating agent, making the concrete slide down and the cores slide up more easily. Similar effects are produced on the severed lower portion of the column as the cores are raised and the severed portion slips down out of the bottom of the shaft. It will readily be seen that the results described are due to the relative movement between the column and the vertical surfaces with which it is in contact, and it will also be seen that like results can be attained by making the shaft or container movable, with the cores stationary; or by having both movable, in which case the cores would, preferably be raised first, after which the shaft would be raised. Then both would descend simultaneously.

As before stated, I prefer to have the column high enough to "stabilize" its lower portion, so that the products removed therefrom will be self-sustaining though unset. If the height is not sufficient for this result, the needed additional compacting or "densifying" can be secured by the use of knives of suitable thickness. The knives can be forced into the column only by crowding the material out of their way, thereby compacting the material more or less, according to their thickness. If the bevel of the knife-edges is entirely on the underside the compacting effect is downward, upon the portion being severed from the column. If the bevel is all on the upper side the effect is upward; and if the bevel is partly on one side and partly on the other, as shown, the effect is correspondingly divided. In this way it is possible to divide the compacting or densifying effect so that the desired pressure can be exerted on the portion which is being severed.

The machine described above is automatic in character. In Figs. 13 to 20 inclusive is illustrated a hand-operated machine of simple and inexpensive construction, for use where for any reason power is not available. In this machine the frame, which need not be described in detail, is preferably made of timbers, as shown. The upwardly tapered hollow shaft 70 is preferably made of planks, planed at least on their inner surfaces, and the rear wall is preferably removable, being held in place by means, for example, of cross bars 71 seated on hooks 72. The cores 73 are hung on actuating rods 74 passing through slots in a guide plate 75 and connected by means of links 76 to the two parallel members 77 which are fulcrumed at 78 to constitute an operating lever. The latter is actuated by a depending handle 79. The cores are positioned in the shaft, and guided in their vertical movements, preferably by thin bars or rods 73$^a$, adapted to bear at their ends on the inner surfaces of the shaft-walls.

The pallet 80 is supported at the bottom of shaft 70 by a table 81 which can be raised into position preferably by means of a wedge-block 82 sliding horizontally on the inclined upper surface of a lower support 83. The wedge-block is connected by means of a link 84 to an arm 85 on a transverse shaft 86 which can be rocked by a hand lever 87 to slide the block back and forth and thus raise and lower the table and pallet. The table is mounted on guide pins 88 so it can move vertically but not horizontally.

The compacted and unwatered lower portion of the column in shaft 70 is severed by means of a saw composed of two or more fine wires 89, Fig. 16, mounted in a horizontal frame 90, Fig. 14, which is provided at its sides with guide rods 90$^a$ working loosely in guide apertures in the upright frame members 91. The wires are held securely in the frame by means of tapered clamps 92, Figs. 14 and 16, threaded on their outer ends to receive the clamping nuts 93. The frame can be shifted sidewise to give a reciprocatory sawing movement to the wires, by means of pivoted handle 94 which is connected to the frame by means of a link 95. To operate the saw the frame is pushed forward by means of the cross member 96, the operator at the same time rocking the lever 94. The wires are thus advanced rapidly through the slot 97, Fig. 18, in the lower portion of the shaft 70.

The lower portion of the column may, if desired, be cut vertically into several parts, for example two as in the machine illustrated. For this purpose I fasten to the core-actuating rods 74 a yoke 98, Figs. 13, 18, 19, and hang from the ends of the yoke a pair of rods 99. Across the bottom of the rods a fine wire 100 is stretched. At one end the wire is securely fastened to the rod and at the other it passes under a grooved roller 101, Fig. 17, and is fastened to a capstan-bar 102. The rods 99 are spaced apart at the bottom by means of rollers 103, Fig. 18.

From the foregoing the operation of the machine will be readily understood. The parts being in the position shown in Fig. 18, with the shaft 70 containing the requisite amount of the cementitious mixture, the operator raises the handle 79. This raises the cores 73, and also raises the rods 99 thereby drawing the cutting wire 100 up into the lower portion of the column between cores and dividing said lower portion into two parts. When the yoke 98 strikes the guide plate 75 and is arrested thereby the operator pushes the frame 90 forward, at the same time shaking the lever 94 to give the twisted wires 89 the sawing movement already described. The divided lower portion of the column is thus severed. In most cases the upper column is held up by the friction on the cores and inner surface of the shaft. To make certain that the column will not descend prematurely the operator can push into the path of the severing wires 89 the sheet metal slides 104, Figs. 18 and 20, which give the slight additional support that may be needed to prevent the column from starting to fall.

The lower portion of the column having been divided and severed, the U-shaped member 105, Figs. 13 and 14, is lifted from the sockets 106, and the hinged doors 107 of the lower portion of the shaft, below the path of the sawing wires 89, are swung open to give egress for the products imprisoned within, as indicated in Fig. 20. The operator now draws toward him the lever 108, Figs. 14 and 18, which retracts the horizontally slidable frame 109 and brings the rabbets 110 in the side members of the frame immediately under the ends of the pallet 80. The lever 87 is then drawn back, thereby lowering the table 88 and allowing the pallet to seat itself in the aforesaid rabbets, as shown in Fig. 20. Placing a fresh pallet, as 111, on the frame the latter is advanced by means of the lever 108, thereby carrying the loaded pallet 80 to the rear. In this operation the concrete or cementitious articles on the pallet are carried horizontally out of the shaft or container through the opening provided by the doors 107. At the same time the fresh pallet is carried into position under the shaft. The loaded pallet is then removed, and the table 81 and the empty pallet thereon are raised by means of lever 87, after which the cores 73 and dividing wire 100 are lowered by pulling down on the handle 79, the slides 104 being of course withdrawn if they had previously been inserted. The downward movement of the cores starts the column, which then falls freely and strikes the pallet preferably with a more or less heavy impact. The operations described are then repeated, the cementitious column being maintained at the desired height by adding fresh mixture, of proper consistency, continuously or at intervals as may be most convenient or suitable under the circumstances.

It is to be understood that the invention is not limited to the apparatus herein specifically illustrated and described but can be embodied in a variety of forms without departure from its spirit as defined by the following claims. The method or process described, and the severing and dividing devices illustrated in connection with the hand-operated machine, are not claimed herein but will be covered by later applications.

The term "concrete" as used hereinbefore and in the claims is intended to include mixtures in which there is a cementitious ingredient, as for example a mixture of sand, cement and water.

I claim:—

1. In a machine for making hollow concrete articles, in combination, an element comprising an upright hollow shaft or container for an unset cementitious column; an element comprising a core arranged vertically in the shaft, whereby the cementitious column is given a tubular form; means for raising and lowering one of said elements relatively to the column; and means for severing the lower portion of the column.

2. In a machine for making hollow concrete articles, in combination, an element comprising an upright hollow shaft or container for an unset cementitious column, and an element comprising an upright core arranged in the shaft to make the cementitious column tubular, one of said elements being vertically movable; means for raising and lowering the vertically movable element; and means for removing a section of the column from the bottom thereof while the vertically movable element is in a raised position.

3. In a machine for making hollow concrete articles, in combination, an element comprising an upright shaft or container adapted to contain an unset cementitious column; an element comprising an upright core in said shaft, whereby the cementitious column is given a tubular form; mechanism for raising one of said elements relatively to the column; cutting mechanism for severing the lower portion of the column; means for causing the raised element and the remaining portion of the column to descend together; and means for actuating said means and mechanisms in the proper order.

4. In a machine for making hollow concrete articles, in combination, an upright hollow shaft or container for an unset cementitious column; an upright core in the shaft whereby the cementitious column is given a tubular form; knives movable into and out of the lower portion of the column to sever therefrom the part below the knives; mechanisms for actuating the knives; mechanism for raising and lowering the core relatively to the cementitious column; and means for actuating said mechanism in the proper order.

5. In a machine for making hollow concrete articles, in combination, an upright hollow shaft or container for an unset cementitious column; an upright core in said shaft to give the column therein a tubular form; mechanism for raising the core and allowing the same to drop from its upper to its lower position, means for severing the lower portion of the column; and means for removing the severed lower portion of the column after the core has been raised but before it is allowed to drop.

6. In a machine for making hollow concrete articles, in combination, an element comprising an upright hollow shaft or container for an unset cementitious column; an element comprising an upright core in the shaft; means for raising and lowering one of the elements relatively to the column; a movable table below the shaft to support a removable closure for the shaft at the bottom thereof, means for severing from the cementitious column a portion thereof immediately above the removable closure; means for actuating the said table to remove said closure and with it the severed portion of the column; and mechanism for actuating the above-mentioned means in the proper order.

7. In a machine for making hollow concrete articles, in combination, an upright hollow shaft or container for an unset cementitious column, an upright vertically movable core therein, means for raising and lowering the core, a vertically movable table below the shaft to support a removable closure at the bottom thereof, means for actuating the table, means for severing from the column a porton thereof above the removable closure, and mechanism, including a plurality of cams, for actuating the foregoing means in the proper order.

8. In a machine for making hollow concrete articles, in combination, an upright hollow shaft or container for an unset cementitious column, an upright vertically movable core in the shaft, means for raising and lowering the core, a pair of knives movable into and out of the lower part of the column from two sides thereof to sever a portion therefrom, means for actuating the knives, means for removing the severed portion of the column, and mechanism for actuating the foregoing means in proper order.

9. In a machine for making hollow concrete articles, in combination, an element comprising an upright hollow shaft or container for an unset cementitious column, and an element comprising an upright core in the shaft, one of said elements being vertically movable; means for raising and lowering the vertically movable element; means for removing a section of the column from the lower part thereof; and means for heating the column while in the shaft to facilitate hydration of the cementitious ingredient.

10. In a machine for making hollow concrete articles, in combination, an upright hollow shaft or container for an unset cementitious column; an upright core in the shaft; means for raising the core and releasing the same to allow it to drop suddenly; cutting means movable into and out of the lower part of the column to sever a portion thereof; and actuating mechanism for the foregoing means, operating to suddenly withdraw the cutting means from the column substantially simultaneously with the release of the core; and means, operating before the withdrawal of the cutting means, to remove the severed portion of the column.

11. In a machine for making hollow concrete articles, in combination, upright inner and outer elements adapted to support between them an unset cementitious column of tubular form, the column being movable downwardly relatively to the outer element, means for removing successive sections from the lower part of the column to form hollow concrete articles; and means to raise one of said elements relatively to the column; and to allow it to descend with the remaining portion of the column after each removal of a section from the lower part thereof.

12. In a machine for making hollow concrete articles, in which such articles are formed by removing successive sections from the lower portion of an intermittently descending unset cementitious column of tubular form, the combination with inner and outer upright elements between which the column is maintained, of means for producing relative upward and downward movement between the column and said elements, and means for severing successive sections from the lower portion of the tubular column, for the purpose set forth.

13. In a machine for making hollow concrete articles, in which such articles are formed by removing successive sections from the lower portion of an intermittently descending unset cementitious column of tubular form, the combination with inner and outer upright elements between which the column is maintained, of means for removing a section of the column from the bottom thereof after each descent, means, operable in harmony therewith, for raising and lowering one of said elements, and means for severing successive sections from the lower portion of the tubular column, for the purpose set forth.

14. In a machine for making hollow concrete articles, in which such articles are formed by removing successive sections from the bottom of an intermittently descending unset cementitious column of tubular form, the combination with an inner core and an outer shaft or container in which the column descends, of means to raise the core relatively to the column before removal of each section and to lower the core with the remaining portion of the column after removal of each section, and means for severing successive sections from the lower portion of the column, for the purpose set forth.

In testimony whereof I hereunto affix my signature.

ALFRED OWEN CROZIER.